(12) United States Patent
Knorpp et al.

(10) Patent No.: US 9,983,603 B2
(45) Date of Patent: May 29, 2018

(54) BOOST CONVERTER AND METHOD FOR ITS OPERATION

(75) Inventors: Thomas Knorpp, Freiberg (DE);
Michael Ruffer, Ludwigsburg (DE);
Stephan Binhack, Karlsruhe (DE);
Wolfgang Mollenkopf, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1039 days.

(21) Appl. No.: 13/811,961

(22) PCT Filed: Jun. 14, 2011

(86) PCT No.: PCT/EP2011/059794
§ 371 (c)(1),
(2), (4) Date: May 13, 2013

(87) PCT Pub. No.: WO2012/013409
PCT Pub. Date: Feb. 2, 2012

(65) Prior Publication Data
US 2013/0234683 A1    Sep. 12, 2013

(30) Foreign Application Priority Data

Jul. 27, 2010   (DE) .................. 10-2010-038-489

(51) Int. Cl.
*H02M 3/156*   (2006.01)
*G05F 1/46*   (2006.01)
*H02M 1/00*   (2006.01)

(52) U.S. Cl.
CPC .............. *G05F 1/46* (2013.01); *H02M 3/156* (2013.01); *H02M 2001/0003* (2013.01); *H02M 2001/0022* (2013.01)

(58) Field of Classification Search
CPC .......... H02M 2001/0025; H02M 3/156–3/158
(Continued)

(56) References Cited

U.S. PATENT DOCUMENTS 7,141,957 B2    11/2006  Tolle et al.
8,508,208 B2 *    8/2013  Klein ......................... 323/284
(Continued)

FOREIGN PATENT DOCUMENTS

CN    1682445 A    10/2005
CN    101040423 A    9/2007
(Continued)

OTHER PUBLICATIONS

International Search Report for PCT/EP2011/059794, dated Oct. 17, 2011.

*Primary Examiner* — Emily P Pham
*Assistant Examiner* — Shahzeb K Ahmad
(74) *Attorney, Agent, or Firm* — Norton Rose Fulbright US LLP; Gerard Messina

(57) ABSTRACT

In a boost converter operation, a first voltage that is independent of an input voltage of the boost converter is preset in the boost converter, having an increased voltage level compared to the input voltage, as the setpoint output voltage, as long as the input voltage is below a first voltage threshold value, which is lower than the first voltage. As soon as the input voltage exceeds the first voltage threshold value, a second voltage that is a function of the input voltage is preset, having a lower voltage level compared to the input voltage, as the setpoint output voltage. As soon as the input voltage drops below a second voltage threshold value, which is lower than the first voltage, the first voltage is again preset as the setpoint output voltage.

4 Claims, 1 Drawing Sheet

(58) Field of Classification Search
USPC .......................... 323/222, 271, 299, 282–285
See application file for complete search history.

(56) References Cited

U.S. PATENT DOCUMENTS

| | | | |
|---|---|---|---|
| 2008/0258699 A1 | 10/2008 | Reberga et al. | |
| 2009/0184699 A1* | 7/2009 | Natsume et al. | 323/282 |
| 2012/0001610 A1* | 1/2012 | Klein | 323/284 |

FOREIGN PATENT DOCUMENTS

| | | |
|---|---|---|
| DE | 197 57 364 | 7/1999 |
| WO | WO 98/49607 | 11/1998 |

* cited by examiner

BOOST CONVERTER AND METHOD FOR ITS OPERATION

BACKGROUND OF THE INVENTION

1. Field of the Invention

The present invention relates to a boost converter and a method for its operation.

2. Description of the Related Art

Boost converters, designated frequently also as step-up converters, represent a special form of a DC converter, and are used to convert an input voltage to an output voltage having an increased voltage potential. Step-up converters have been known for a long time and are used in manifold fields of use, such as in a hybrid or electric vehicle, for converting a low voltage direct voltage (on-board voltage) to a high voltage direct voltage. If the input voltage of the boost converter, in this instance, is close to the desired output voltage, the boost converter begins to oscillate, since one is not able to set transformation ratios that are as small as desired. In order to assure the safety and availability of the boost converter, it is necessary to avoid such a rapid soaring of the boost converter.

BRIEF SUMMARY OF THE INVENTION

The present invention provides a method for operating a boost converter, in which a first voltage, independent of an input voltage of the boost converter, having a higher voltage level than the input voltage, is preset in the boost converter as the setpoint output voltage, as long as the input voltage is below a first voltage threshold value, which is on a lower voltage level than the first voltage. As soon as the input voltage exceeds the first voltage threshold value, a second voltage that is a function of the input voltage of the boost converter is preset in the boost converter, having a lower voltage level compared to the input voltage, as the setpoint output voltage. As soon as the input voltage drops below a second voltage threshold value, which lies on a lower voltage level than the first voltage, the first voltage is again preset in the boost converter as the setpoint output voltage.

Furthermore, the present invention provides a boost converter for converting an input voltage to an output voltage having a raised voltage level, which is operated using a method according to the present invention.

According to the present invention, a first voltage threshold value is established for the input voltage of the boost converter, which lies below the first voltage at a sufficient separation that represents a usual setpoint output voltage of a boost converter. In this way, a first operating range is defined, in which the soaring of the boost converter is safely avoided. In response to the reaching of the first voltage threshold value, a second voltage is specified as the setpoint output voltage, which preferably lies below the input voltage of the boost converter by a specifiable amount. This creates a second operating range of the boost converter, in which the boost converter is actually deactivated, so that in this operating range, too, the soaring of the boost converter is safely avoided. The first voltage threshold value is thereby meaningfully established in such a way that, on the one hand, there is no danger of the soaring of the boost converter, and on the other hand, the new setpoint output voltage, that lies barely below the input voltage, is sufficient so as safely to operate subsequent circuit components. If the input voltage again falls below a second voltage threshold value, which is also below the first voltage, the first voltage is again preset in the boost converter as the setpoint output voltage, and thus the system returns to the first operating range. The second voltage threshold value is thereby meaningfully established in such a way that, on the one hand, after switching over to the first setpoint output voltage, there is no longer any danger of the soaring of the boost converter, but on the other hand, the second setpoint output voltage, that lies barely below the input voltage, which is still specified before the reaching of the second threshold value, is sufficient so as to be able to safely operate the subsequent circuit components.

Since the first voltage specified in the first operating range of the boost converter as the setpoint output voltage is able to vary during operation, it is provided according to one specific embodiment of the present invention that the voltage threshold values be established as a function of the first voltage. In this way, one is able to assure that, on the one hand, the change to the second voltage as the setpoint output voltage is made as late as possible and, on the other hand, the return to the first voltage as the setpoint output voltage is made again as early as possible.

In order to avoid a constant switching back and forth of the setpoint output voltage between the first and the second voltage, it is provided according to one additional advantageous specific embodiment of the present invention that the second voltage threshold value lie at a lower voltage level than the first voltage threshold value.

Further features and advantages of specific embodiments of the present invention result from the following description with reference to the enclosed figures.

DETAILED DESCRIPTION OF THE INVENTION

Figure 1:
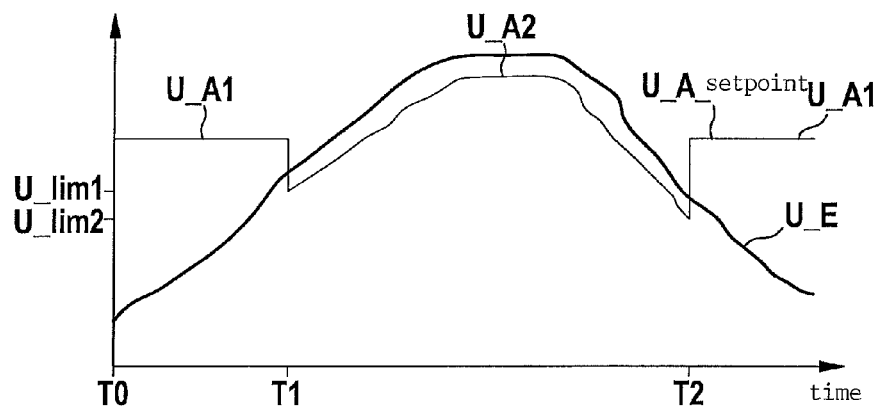
FIG. 1 shows a schematic representation of the curve over time of the voltages at a boost converter according to the present invention and according to a first application case.

FIG. 1 shows a curve over time of input voltage $U\_E$ and setpoint output voltage $U\_A\_setpoint$ of a boost converter operated using the method, according to the present invention, but not shown. In a first time range from $T0$ to $T1$, the input voltage rises continually, but is always below a first voltage threshold value $U\_lim1$, which is established to be below a first voltage $U\_A1$. In this time range ($T0$-$T1$), first voltage $U\_A1$, that is independent of the input voltage, is preset in the boost converter as the setpoint output voltage $U\_A\_setpoint$. In this context, first voltage $U\_A1$ specifies an increased voltage level compared to input voltage $U\_E$, which is required for the safe functional capacity of subsequent circuit components. First voltage $U\_A1$ is shown in FIG. 1 as a constant voltage, but may also be variable over time. It is meaningful, at least in this case, to establish first voltage threshold value $U\_lim1$ as a function of first voltage $U\_A1$, to avoid the soaring of the boost converter, securely at all times.

At time $T1$, input voltage $U\_E$ exceeds first voltage threshold value $U\_lim1$, whereupon a second voltage $U\_A2$ is preset in the boost converter as the new setpoint output voltage. The second voltage $U\_A2$ is specified as a function of input voltage $U\_E$ of the boost converter, and preferably lies below input voltage $U\_E$ by a specifiable amount. This being the case, setpoint output voltage $U\_A\_setpoint$ follows input voltage U_E at a lower voltage level compared to input level U_E. This establishment of a setpoint output voltage U_A_setpoint below input voltage U_E of boost converter effectively means a deactivation of the boost converter. In this way, the soaring of the boost converter is also avoided in this second operating range. At a time T2, the input voltage falls below a second voltage threshold value U_lim2, which is also at a lower voltage level than first voltage U_A1, and also at a lower voltage level than first voltage threshold value U_lim1. At this time, the original setpoint output voltage in the form of first voltage U_A is again preset in the boost converter.

Because of the method according to the present invention, the soaring of the boost converter independently of the input voltage is securely avoided, without, however, impairing the operation of the subsequent circuit components.

Besides in the operation as boost converter, direct current converters may also be designed as voltage reduction units, frequently also designated as down converters, step-down converters or buck converters. Such voltage reduction units are used, for instance, in hybrid or electric vehicles for converting a high direct voltage to a low direct voltage (on-board voltage). Certain combinations of present high voltage and specified low voltage may be problematical, however, based on the architecture of a DC converter, since the fixed construction of full bridges and half bridges as well as the winding ratio of a transformer cannot be suitable for any conceivable operating point. In such a case, a third voltage is introduced, that is not visible outside the DC converter, in the form of an intermediate circuit voltage, which is greater than the high voltage and is selected in such a way that for each present combination of full bridge, half bridge and transformer and the specified low voltage, an ideal operating point comes about.

In order to lift the high voltage present to the intermediate circuit voltage lying at a higher voltage level, a boost converter is used again. This being the case, the desired voltage reduction unit is implemented by having a combined boost and voltage reduction unit converter, in which the "genuine" voltage reduction unit has a boost converter preconnected to it, which first lifts the input voltage to an even higher voltage level, before the "genuine" voltage reduction unit lowers it subsequently to the desired lower voltage level. In this process, if the difference between the high voltage and the intermediate circuit voltage, and thus the spread between the input voltage and the output voltage of the boost converter becomes too small, the boost converter begins to oscillate, since transmission ratios as small as desired cannot be set. This being the case, the same problem comes up as in the application case as in FIG. 1.

Figure 2:
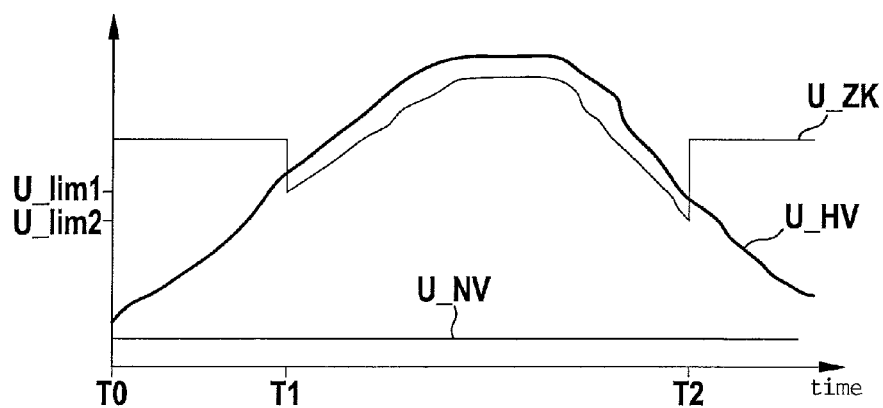
FIG. 2 shows a schematic representation of the curve over time of the voltages at a boost converter according to the present invention according to a second application case.

By analogy to FIG. 1, FIG. 2 shows schematically the curves over time of input voltage U_HV (high voltage), of output voltage U_NV (low voltage), as well as intermediate circuit voltage U_ZK, that is used as the setpoint output voltage of the boost converter, of the combined boost converter-voltage reduction unit in the operation of the boost converter using the method according to the present invention. The statements made with respect to FIG. 1 apply analogously.

What is claimed is:

1. A method of for operating a boost converter, comprising:
   setting in the boost converter a first voltage, which is independent of an input voltage of the boost converter and having a higher voltage level than the input voltage, as a setpoint output voltage as long as the input voltage is below a first voltage threshold value which is at lower voltage level than the first voltage;
   setting in the boost converter a second voltage, which is a function of the input voltage of the boost converter and having a lower voltage level than the input voltage, as the setpoint output voltage as soon as the input voltage exceeds the first voltage threshold value; and
   setting the first voltage in the boost converter as the setpoint output voltage as soon as the input voltage falls below a second voltage threshold value which is at a lower voltage level than the first voltage.

2. The method as recited in claim 1, wherein the first and second voltage threshold values are established as a function of the first voltage.

3. The method as recited in claim 2, wherein the second voltage threshold value is at a lower voltage level than the first voltage threshold value.

4. The method as recited in claim 2, wherein the second voltage lies below the input voltage by a specified amount.

* * * * *